US011709111B2

United States Patent
Bai et al.

(10) Patent No.: US 11,709,111 B2
(45) Date of Patent: Jul. 25, 2023

(54) DEVICE AND METHOD FOR DETECTING WAVEFRONT ERROR BY MODAL-BASED OPTIMIZATION PHASE RETRIEVAL USING EXTENDED NIJBOER-ZERNIKE THEORY

(71) Applicant: Zhejiang University, Hangzhou (CN)

(72) Inventors: Jian Bai, Hangzhou (CN); Lei Zhao, Hangzhou (CN); Binjie Lu, Hangzhou (CN); Xiao Huang, Hangzhou (CN); Xiangdong Zhou, Hangzhou (CN); Jing Hou, Hangzhou (CN)

(73) Assignee: ZHEJIANG UNIVERSITY

( * ) Notice: Subject to any disclaimer, the term of this patent is extended or adjusted under 35 U.S.C. 154(b) by 113 days.

(21) Appl. No.: 17/292,982

(22) PCT Filed: Jul. 17, 2020

(86) PCT No.: PCT/CN2020/102651
§ 371 (c)(1),
(2) Date: May 11, 2021

(87) PCT Pub. No.: WO2021/008606
PCT Pub. Date: Jan. 21, 2021

(65) Prior Publication Data
US 2022/0003633 A1  Jan. 6, 2022

(30) Foreign Application Priority Data
Jul. 18, 2019  (CN) .......................... 201910650327.6

(51) Int. Cl.
*G01M 11/02* (2006.01)
*G01B 9/02055* (2022.01)
*G01J 9/02* (2006.01)

(52) U.S. Cl.
CPC ..... *G01M 11/0271* (2013.01); *G01B 9/02078* (2013.01); *G01J 9/02* (2013.01)

(58) Field of Classification Search
CPC ......... G01M 11/0207; G01M 11/0221; G01M 11/0271; G01M 11/0242
(Continued)

(56) References Cited

U.S. PATENT DOCUMENTS

| 4,641,962 A * | 2/1987 | Sueda | G01M 11/0264 356/127 |
| 5,448,355 A * | 9/1995 | Noguchi | G01M 11/02 250/237 G |

(Continued)

FOREIGN PATENT DOCUMENTS

| CN | 102252763 A | 11/2011 | |
| CN | 102589854 A * | 7/2012 | ............. G01B 11/24 |

(Continued)

OTHER PUBLICATIONS

Dirksen, Peter et al. "Characterization of a projection lens using the extended Nijboer-Zernike approach". Optical Microlithography XV, Proc. of SPIE vol. 4691, 2002, pp. 1392-1399. (Year: 2002).*

(Continued)

*Primary Examiner* — Michael A Lyons
(74) *Attorney, Agent, or Firm* — Wendi E. Uzar

(57) ABSTRACT

The disclosure provides a device for detecting a wavefront error by modal-based optimization phase retrieval using an extended Nijboer-Zernike (ENZ) theory. The detection device includes a point light source (1), a half mirror (2), a lens (3) to be tested, a plane mirror (4) and an image sensor (5). The wavefront error of the component under test is characterized by using a Zernike polynomial, and a Zernike polynomial coefficient is solved based on an ENZ diffraction theory. The present disclosure realizes the one-time full-aperture measurement on the wavefront error of a large-aperture optical component, and can use a partially overexposed image to achieve accurate wavefront error retrieval. Meanwhile, the present disclosure overcomes the contradic- (Continued)

tion between underexposure and high signal-to-noise ratio (SNR) caused by a limited dynamic range when the image sensor (5) acquires an image. The detection device is simple and does not have high requirements for the experimental environment.

1 Claim, 2 Drawing Sheets

(58) Field of Classification Search
USPC .......................................................... 356/515
See application file for complete search history.

(56) References Cited

U.S. PATENT DOCUMENTS

| | | | |
|---|---|---|---|
| 6,911,637 B1 | 6/2005 | Vorontsov et al. | |
| 2011/0090510 A1* | 4/2011 | Furukawa | G01B 9/02057 356/511 |
| 2021/0239565 A1* | 8/2021 | Dahl | G01B 11/14 |

FOREIGN PATENT DOCUMENTS

| | | | | |
|---|---|---|---|---|
| CN | 103033260 A | | 4/2013 | |
| CN | 105588519 A | * | 5/2016 | ............. G01B 11/24 |
| CN | 108225187 A | | 6/2018 | |
| CN | 207850322 U | | 9/2018 | |
| CN | 109990983 A | * | 7/2019 | |
| CN | 110375964 A | | 10/2019 | |
| JP | 2002206990 A | | 7/2002 | |
| JP | 2011058872 A | * | 3/2011 | |

OTHER PUBLICATIONS

Janssen, Augustus J.E.M. "Extended Nijboer-Zernike approach for the computation of optical point-spread functions". J. Opt. Soc. Am. A, vol. 19, No. 5, May 2002, pp. 849-857. (Year: 2002).*

Dirksen, Peter et al. "Aerial image based lens metrology for wafer steppers". Optical Microlithography XIX, Proc. of SPIE vol. 6154, 61540X, 2006. (Year: 2006).*

Zhao, Lei et al. "Comparative analysis of mid-spatial frequency errors measurement using multiple phase retrieval algorithms". Optical Design and Testing VIII, Proc. of SPIE vol. 10815, 108151M, 2018. (Year: 2018).*

Shao, Jing and Ma, Dong-Mei, "Testing optical system with high NA based on phase retrieval" in the Journal of Applied Optics, Jan. 2013, pp. 105-110, vol. 34 No. 1, Ying Yong Guang Xue Bian Ji Bu Publisher, China.

* cited by examiner

DEVICE AND METHOD FOR DETECTING WAVEFRONT ERROR BY MODAL-BASED OPTIMIZATION PHASE RETRIEVAL USING EXTENDED NIJBOER-ZERNIKE THEORY

The present application claims priority to the Chinese Patent Application No. 201910650327.6, filed with the China National Intellectual Property Administration (CNIPA) on Jul. 18, 2019, and entitled "DEVICE AND METHOD FOR DETECTING WAVEFRONT ERROR BY MODAL-BASED OPTIMIZATION PHASE RETRIEVAL USING EXTENDED NIJBOER-ZERNIKE THEORY", which is incorporated herein by reference in its entirety.

TECHNICAL FIELD

The present disclosure belongs to the technical field of optical measurement, and particularly relates to a device and method for detecting a wavefront error by modal-based optimization phase retrieval using an extended Nijboer-Zernike (ENZ) theory.

BACKGROUND

As countries take inertial confinement fusion (ICF) solid-state laser drivers as their strategic development goals, ICF high-power laser devices have become an important evaluation indicator of a country's comprehensive national strength. The research and control of laser wavefront aberration is an important content in the development process of ICF laser drive systems. The laser wavefront aberration directly affects the performance of the beam and the uniformity of the system to bombard the target pellet. Therefore, the study of wavefront aberration detection has important application value in ICF. The ICF drive system has thousands of large-aperture optical lenses, and the surface quality of these large-aperture lenses directly affects the focusing performance of the drive system. Due to the surface defects of the large-aperture optical lens and the processing errors left during the grinding process of the processing tool, the wavefront emitted by the large-aperture optical lens is no longer ideal, and there is a wavefront error. Wavefront errors are divided into low-frequency, intermediate-frequency and high-frequency errors according to their frequency characteristics. The low-frequency error mainly affects the shape of the focal spot and the uniformity of the bombardment of the target pellet. The intermediate-frequency error will reduce the convergent power and cause filiform damage to the optical components. The high-frequency error will not affect the fusion system due to the large scattering angle caused by it, but it will lower the damage threshold of the aperture stop. Therefore, the detection and control of the intermediate and low-frequency errors of the large-aperture optical lens becomes the key to improving the convergence performance of the high-power laser.

Conventional wavefront error detection methods include coordinate detection method, knife-edge tester detection method, Shack-Hartmann wavefront sensor (SHWFS) method and interferometry. The coordinate detection method can achieve in-situ detection, but the resolution is low, and the detection accuracy is usually about 1 μm. The knife-edge tester detection method has high sensitivity, but it cannot achieve quantitative detection. The SHWFS method is easy to use, but its accuracy and resolution need to be improved. Interferometry features high strength and good measurement repeatability, and has become the mainstream wavefront detection method. However, it has high requirements for the environment and is very sensitive to vibration and air disturbance. When interferometry is used to measure a large-aperture optical lens, there are problems of low resolution and insufficient range. Since the phase retrieval method was successfully used to measure the spherical aberration of the Hubble space telescope (HST) in the 1990s, the phase retrieval method has been extensively studied. The conventional phase retrieval method inversely infers the phase distribution by using the diffraction spot acquired at the focal plane or defocus position through Fourier transform. The experimental device is simple, has strong anti-vibration ability, and can realize in-situ detection. However, it is restricted by the resolution and sampling number, and needs to adopt a sub-aperture stitching method to measure the wavefront of a large-aperture optical lens. The sub-aperture stitching method is complicated in operation and the position error of the sub-aperture will result in a measurement error.

SUMMARY

In order to overcome the shortcomings of the prior art, an objective of the present disclosure is to provide a device and method for detecting a wavefront error by modal-based optimization phase retrieval using an extended Nijboer-Zernike (ENZ) theory. The present disclosure solves the problems of the conventional iterative phase retrieval method in measuring the wavefront error of a large-aperture optical lens. The conventional iterative phase retrieval method uses a sub-aperture stitching method, which has a detection error, a large amount of calculation due to a high sampling number, and high difficulty to accurately determine the defocus position.

To achieve the above purpose, the present disclosure provides the following technical solutions.

A device for detecting a wavefront error by modal-based optimization phase retrieval using an extended Nijboer-Zernike (ENZ) theory includes a point light source, a half mirror, a lens to be tested, a plane mirror and an image sensor, where the half mirror is located behind the point light source at an angle of 45 degrees; the lens to be tested and the plane mirror are sequentially arranged behind the point light source, and the point light source, the half mirror, the lens to be tested and the plane mirror share an optical axis; a front focus of the lens to be tested is located at the point light source; the image sensor is located on an optical path of reflected light of the half mirror, and is located at a defocus position of the lens to be tested; the image sensor shares an optical axis with the reflected light of the half mirror.

Further, the point light source is a spherical interferometer that emits a spherical wave.

Further, the image sensor is a charge coupled device (CCD) camera.

A method for detecting a wavefront error by modal-based optimization phase retrieval using an ENZ theory is provided, where the method is implemented by using the above detection device, and includes the following steps:

S1: emitting, by a point light source, a spherical wave; collimating, by a lens to be tested, the spherical wave; reflecting, by a plane mirror and a half mirror, the spherical wave; acquiring, by an image sensor, a defocus intensity image with a wavefront error of the lens to be tested; and S2: performing phase retrieval on the defocus intensity image acquired by step S1 by modal-based optimization phase retrieval using an ENZ theory to obtain the wavefront error of the tested lens.

Further, step S2 specifically includes:

S2.1: using defocus intensity image $I_{m'}$ obtained in step S1 as an initial defocus intensity image for a subsequent iteration in an ENZ mode; setting an initial defocus distance of the image sensor (5) as $f_0$; setting a total number K of iterations to remove a cross term, an initial number k=1 of iterations to remove the cross term, a total number L of iterations for a defocus position, an initial number l=1 of iterations for the defocus position, an aperture of the lens (3) to be tested and a number of terms in a Zernike polynomial;

S2.2: calculating each element of a modal gradient matrix of a system of equations for solving a coefficient of the Zernike polynomial according to a defocus distance, to obtain a modal gradient matrix V of the system of equations for solving a coefficient of the Zernike polynomial;

S2.3: removing an overexposed pixel of initial defocus intensity image $I_{m'}$ to obtain a defocus intensity image with the overexposed pixel removed, and removing an element in a row corresponding to the overexposed pixel from modal gradient matrix V to obtain a modal gradient matrix with the overexposed pixel removed;

S2.4: calculating a Zernike coefficient matrix A of the Zernike polynomial by using a least squares method according to the defocus intensity image and the modal gradient matrix with the overexposed pixel removed;

S2.5: calculating cross term $I_c$ of an ENZ diffraction mode according to the Zernike coefficient matrix A;

S2.6: removing cross term $I_c$ from initial defocus intensity image $I_{m'}$ to obtain a defocus intensity image with the cross term removed;

S2.7: determining whether the number k of iterations to remove the cross term is greater than K; if not, letting k=k+1, using the defocus intensity image with the cross term removed as an initial defocus intensity image, and returning to step S2.3; if yes, proceeding to the next step;

S2.8: determining whether the number l of iterations for the defocus position is greater than L; if not, calculating a correction value $\Delta f$ of the defocus distance according to $$\Delta f = \frac{\beta_{power}\lambda}{\pi(1-\sqrt{1-NA^2})},$$

subtracting the correction value of the defocus distance from a current value thereof as a defocus distance for a subsequent iteration, taking the defocus intensity image obtained in step S1 as an initial defocus intensity image, letting the number of iterations for the defocus position be l=l+1, letting the number of iterations to remove the cross term be k=1, and returning to step S2.2, where, $\beta_{power}$ is a coefficient of a fourth term of the Zernike polynomial, $\lambda$ represents a wavelength of incident light, and N represents the number of pixels in a lateral direction of the defocus intensity image; if yes, using the obtained Zernike coefficient matrix to fit the wavefront phase error of the lens (3) to be tested, and calculating a true defocus position U of the image sensor (5) by $$U = \exp\left(i \times \sum_{n,m} \beta_n^m \times Z_n^m\right)$$

according to the Zernike coefficient matrix, where, $\beta_n^m$ represents a Zernike coefficient in the Zernike coefficient matrix, $Z_n^m$ represents the Zernike polynomial, i is an imaginary number, (m,n) represents a pixel of the defocus intensity image, m=1, 2, . . . , M, n=1, 2, . . . , N; M represents the number of pixels in a vertical direction of the defocus intensity image.

The present disclosure has the following beneficial effects.

The detection device of the present disclosure only needs to acquire a defocus intensity image to perform a one-time full-aperture measurement on a large-aperture optical lens. The detection device and method of the present disclosure do not need to accurately measure one defocus position, but implement the precise determination of the defocus position through an iterative optimization algorithm. The present disclosure can use a partially overexposed image to achieve accurate measurement of the wavefront error.

BRIEF DESCRIPTION OF DRAWINGS

In order to illustrate the embodiments of the present disclosure or the technical solutions of the prior art, the accompanying drawing to be used will be described briefly below. Notably, the following accompanying drawing merely illustrates some embodiments of the present disclosure, but other accompanying drawings can also be obtained those of ordinary skill in the art based on the accompanying drawing without any creative efforts.

Figure 1:
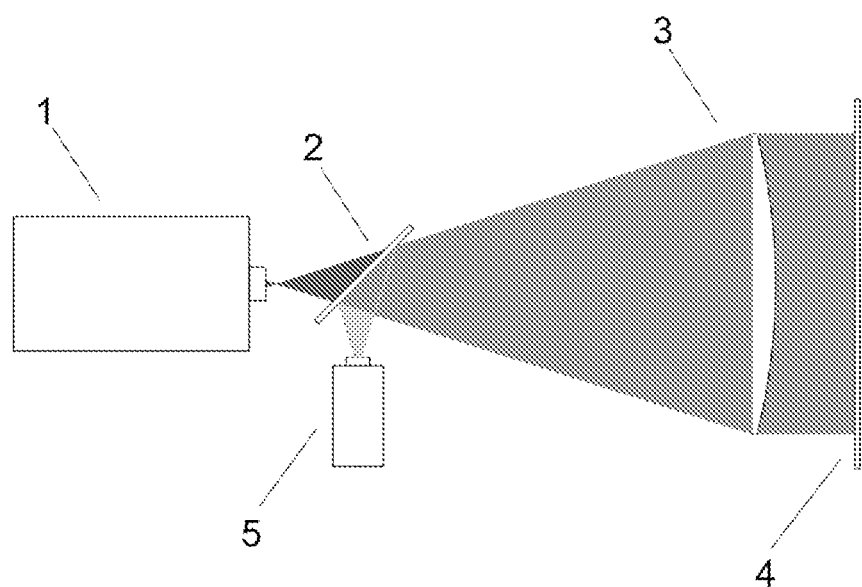
FIG. 1 is a schematic diagram of a wavefront error detection device according to the present disclosure.

Reference Numerals: 1. point light source; 2. half mirror; 3. lens to be tested; 4. plane mirror; and 5. image sensor.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts should fall within the protection scope of the present disclosure.

In order to overcome the shortcomings of the prior art, an objective of the present disclosure is to provide a device and method for detecting a wavefront error by modal-based optimization phase retrieval using an extended Nijboer-Zernike (ENZ) theory. The present disclosure solves the problems of the conventional iterative phase retrieval method in measuring the wavefront error of a large-aperture optical lens. The conventional iterative phase retrieval method uses a sub-aperture stitching method, which has a detection error, a large amount of calculation due to a high sampling number, and high difficulty to accurately determine the defocus position.

To make the above objectives, features and advantages of the present disclosure clearer and more comprehensible, the present disclosure is further described in detail below with reference to the accompanying drawings and specific embodiments.

As shown in FIG. 1, a device for detecting a wavefront error by modal-based optimization phase retrieval using an extended Nijboer-Zernike (ENZ) theory includes a point light source 1, a half mirror 2, a lens 3 to be tested, a plane mirror 4 and an image sensor 5. The half mirror 2 is located behind the point light source 1 at an angle of 45 degrees. The lens 3 to be tested and the plane mirror 4 are sequentially arranged behind the point light source 1, and the point light source 1, the half mirror 2, the lens 3 to be tested and the plane mirror 4 share an optical axis. A front focus of the lens 3 to be tested is located at the point light source 1. The image sensor 5 is located on an optical path of reflected light of the half mirror 2, and is located at a defocus position of the lens 3 to be tested. The image sensor 5 shares an optical axis with the reflected light of the half mirror 2. In the detection device, the half mirror 2 is used to split light to realize the simultaneous measurement of an interferometer and a phase retrieval method; the plane mirror 4 reflects an emitted light wave to realize the return of the light wave.

In one of the embodiments, the point light source 1 is a spherical interferometer that emits a spherical wave with a wavelength of 632.8 nm.

In one of the embodiments, the image sensor 5 is a charge coupled device (CCD) camera, which is used to acquire a light spot image.

Figure 2:
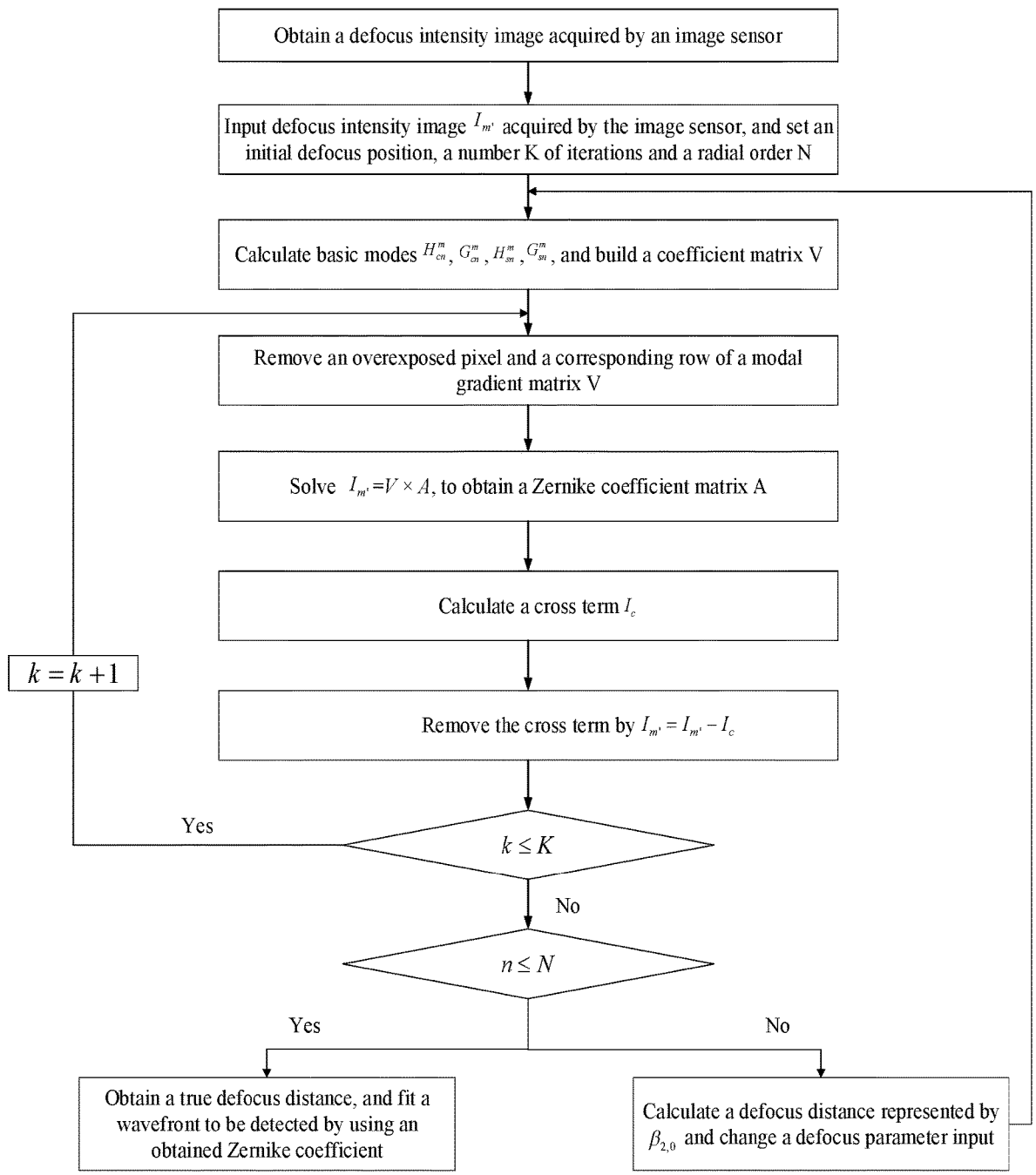
FIG. 2 is a flowchart of detecting a wavefront error by modal-based optimization phase retrieval using an extended Nijboer-Zernike (ENZ) theory.

A method for detecting a wavefront error by modal-based optimization phase retrieval using an ENZ theory, implemented by using the above detection device, includes the following steps (as shown in FIG. 2):

S1: Emit, by a point light source 1, a spherical wave; collimate, by a lens 3 to be tested, the spherical wave; reflect, by a plane mirror 4 and a half mirror 2, the spherical wave; acquire, by an image sensor 5, a defocus intensity image with a wavefront error of the lens 3 to be tested.

S2: Perform phase retrieval on the defocus intensity image acquired by step S1 by modal-based optimization phase retrieval using an ENZ theory to obtain the wavefront error of the tested lens.

S2.1: Use I obtained in step S1 as an initial value of the defocus intensity image for a subsequent iteration in an ENZ mode; set an initial defocus position z0 of the image sensor 5; set a total number K of iterations to remove a cross term and an initial number k=1 of iterations, a total number L of iterations for a defocus position and an initial number l=1 of iterations, an aperture of the lens 3 to be tested, an initial value of a cross term of an ENZ diffraction mode and a number of terms in a Zernike polynomial.

S2.2: Calculate each element of a modal gradient matrix of a system of equations for solving a coefficient of the Zernike polynomial, to obtain a modal gradient matrix V of the system of equations for solving a coefficient of the Zernike polynomial:

$$V = \begin{vmatrix} 4|V_0^0(1,1)|^2 & Hc_1^1(1,1) & Gc_1^1(1,1) & Hs_1^1(1,1) & Gs_1^1(1,1) & \cdots \\ \vdots & \vdots & \vdots & \vdots & \vdots & \ddots \\ 4|V_0^0(M,1)|^2 & Hc_1^1(M,1) & Gc_1^1(1,N) & Hs_1^1(1,N) & Gs_1^1(1,N) & \cdots \\ 4|V_0^0(2,1)|^2 & Hc_1^1(2,1) & Gc_1^1(2,1) & Hs_1^1(2,1) & Gs_1^1(2,1) & \cdots \\ \vdots & \vdots & \vdots & \vdots & \vdots & \ddots \\ 4|V_0^0(M,N)|^2 & Hc_1^1(M,N) & Gc_1^1(M,N) & Hs_1^1(M,N) & Gs_1^1(M,N) & \cdots \end{vmatrix}$$

$$\begin{vmatrix} Hc_n^m(1,1) & Gc_n^m(1,1) & Hs_n^m(1,1) & Gs_n^m(1,1) & \cdots & Hc_N^M(1,1) & Gc_N^M(1,1) & Hs_N^M(1,1) & Gs_N^M(1,1) \\ \vdots & \vdots & \vdots & \vdots & \ddots & \vdots & \vdots & \vdots & \vdots \\ Hc_n^m(1,N) & Gc_n^m(1,N) & Hs_n^m(1,N) & Gs_n^m(1,N) & \cdots & Hc_N^M(1,N) & Gc_N^M(1,N) & Hs_N^M(1,N) & Gs_N^M(1,N) \\ Hc_n^m(2,1) & Gc_n^m(2,1) & Hs_n^m(2,1) & Gs_n^m(2,1) & \cdots & Hc_N^M(2,1) & Gc_N^M(2,1) & Hs_N^M(2,1) & Gs_N^M(2,1) \\ \vdots & \vdots & \vdots & \vdots & \ddots & \vdots & \vdots & \vdots & \vdots \\ Hc_n^m(M,N) & Gc_n^m(M,N) & Hs_n^m(M,N) & Gs_n^m(M,N) & \cdots & Hc_N^M(M,N) & Gc_N^M(M,N) & Hs_N^M(M,N) & Gs_N^M(M,N) \end{vmatrix}$$

where $Hc_n^m(m,n) = 8Re[i^m V_n^m(x_{(m,n)}, y_{(m,n)}, f)V_0^{0*}(x_{(m,n)}, y_{(m,n)}, f)]\cos[m\varphi(x_{(m,n)}, y_{(m,n)})]$, $Gc_n^m(m,n) = -8Im[i^m V_n^m(x_{(m,n)}, y_{(m,n)}, f)V_0^{0*}(x_{(m,n)}, y_{(m,n)}, f)]\cos[m\varphi(x_{(m,n)}, y_{(m,n)})]$, $Hs_n^m(m,n) = -8Re[i^m V_n^m(x_{(m,n)}, y_{(m,n)}, f)V_0^{0*}(x_{(m,n)}, y_{(m,n)}, f)]\sin[m\varphi(x_{(m,n)}, y_{(m,n)})]$, $Gs_n^m(m,n) = -8Im[i^m V_n^m(x_{(m,n)}, y_{(m,n)}, f)V_0^{0*}(x_{(m,n)}, y_{(m,n)}, f)]\cos[m\varphi(x_{(m,n)}, y_{(m,n)})]$, where, $(x_{(m,n)}, y_{(m,n)})$ represents coordinates of pixel (m,n) in an image plane; f represents a defocus distance; $V_n^m(\cdot)$ represents a kernel of the ENZ theory; $Hc_n^m(m,n)$, $Gc_n^m(m,n)$, $Hs_n^m(m,n)$ and $Gs_n^m(m,n)$ are intermediate variables; i is an imaginary number; $m\varphi(x_{(m,n)}, y_{(m,n)})$ is an azimuthal frequency of pixel (m,n) in the image plane; $\varphi(x_{(m,n)}, y_{(m,n)})$ represents angles in polar coordinates of image coordinates $(x_{(m,n)}, y_{(m,n)})$; Re represents taking a real part; Im represents taking an imaginary part; N and M represent a radial order and an azimuthal frequency of the Zernike polynomial, respectively.

S2.3: Remove an overexposed pixel of initial defocus intensity image $I_m$, to obtain $I^{(k)}$, and remove an element in a corresponding row of modal gradient matrix $V_{mm}$.

S2.4: Calculate a coefficient matrix A of the Zernike polynomial by using a least squares method according to the defocus intensity image and the modal gradient matrix with the overexposed pixel removed.

$$I^{(k)} = V \times A$$

S2.5: Calculate cross term $I_c$ of the ENZ diffraction mode according to the Zernike coefficient matrix A.

$$I_c(x,y) = 4 \sum_{n1,m1;n2,m2} "Re[\beta_{n_1}^{m_1} \beta_{n_2}^{m_2*} i^{m_1-m_2} V_{n_1}^{m_1} V_{n_2}^{m_2*}] \cos m_1\varphi \cos m_2$$

$$\varphi 4 \sum_{n1,m1;n2,m2} "Im[\beta_{n_1}^{m_1} \beta_{n_2}^{m_2*} i^{m_1-m_2} V_{n_1}^{m_1} V_{n_2}^{m_2*}] \sin m_1\varphi \cos m_2\varphi$$

$$4 \sum_{n1,m1;n2,m2} "Re[\beta_{n_1}^{m_1} \beta_{n_2}^{m_2*} i^{m_1-m_2} V_{n_1}^{m_1} V_{n_2}^{m_2*}] \cos m_1\varphi \sin m_2\varphi$$

$$4 \sum_{n1,m1;n2,m2} "Im[\beta_{n_1}^{m_1} \beta_{n_2}^{m_2*} i^{m_1-m_2} V_{n_1}^{m_1} V_{n_2}^{m_2*}] \sin m_1\varphi sion m_2\varphi$$

where, $\beta_n^m$ represents an element of the Zernike coefficient matrix A.

S2.6: Remove cross term $I_c$ from initial defocus intensity image $I_{m'}$.

$$I = I_{m'} - I_c$$

S2.7: Determine whether the number k of iterations is greater than K; if not, let k=k+1, use the defocus intensity image with the cross term removed as an initial defocus intensity image, and return to step S2.3; if yes, proceed to the next step.

S2.8: Determine whether the number l of iterations is greater than L; if not, calculate a correction value Δf of the defocus distance according to $$\Delta f = \frac{\beta_{power}\lambda}{\pi(1-\sqrt{1-NA^2})},$$

subtract the correction value of the defocus distance from a current value thereof as a defocus distance for a subsequent iteration, take the defocus intensity image obtained in step S1 as an initial defocus intensity image, let the number of iterations for the defocus position be l=l+1, let the number of iterations to remove the cross term be k=1, and return to step S2.2, where, $\beta_{power}$ is a coefficient of a fourth term of the Zernike polynomial, λ represents a wavelength of incident light, and N represents the number of pixels in a lateral direction of the defocus intensity image; if yes, use the obtained Zernike coefficient matrix to fit the wavefront phase error of the lens (3) to be tested, and calculate a true defocus position U of the image sensor (5) by $$U = \exp\left(i \times \sum_{n,m} \beta_n^m \times Z_n^m\right)$$

according to the Zernike coefficient matrix, where, $\beta_n^m$ represents a Zernike coefficient in the Zernike coefficient matrix, $Z_n^m$ represents the Zernike polynomial, and i is an imaginary number.

The embodiments of the present disclosure are described above with reference to the accompanying drawings, but the present disclosure is not limited to the above specific embodiments. The above specific embodiments are merely illustrative and not restrictive. Those of ordinary skill in the art may make several modifications to the present disclosure without departing from the purpose of the present disclosure and the scope of protection of the claims, but these modifications should all fall within the protection of the present disclosure.

What is claimed is:

1. A method for detecting a wavefront error by modal-based optimization phase retrieval using an extended Nijboer-Zernike (ENZ) theory, wherein the method is implemented by using a detection device, comprising a point light source (1), a half mirror (2), a lens (3) to be tested, a plane mirror (4) and an image sensor (5), wherein the half mirror (2) is located behind the point light source (1) at an angle of 45 degrees; the lens (3) to be tested and the plane mirror (4) are sequentially arranged behind the point light source (1), and the point light source (1), the half mirror (2), the lens (3) to be tested and the plane mirror (4) share an optical axis; a front focus of the lens (3) to be tested is located at the point light source (1); the image sensor (5) is located on an optical path of reflected light of the half mirror (2), and is located at a defocus position of the lens (3) to be tested; the image sensor (5) shares an optical axis with the reflected light of the half mirror (2); and wherein the method comprises the following steps:
S1: emitting, by the point light source (1), a spherical wave; collimating, by the lens (3) to be tested, the spherical wave; reflecting, by the plane mirror (4) and the half mirror (2), the spherical wave; acquiring, by the image sensor (5), a defocus intensity image with a wavefront error of the lens (3) to be tested; and
S2: performing phase retrieval on the defocus intensity image acquired by step S1 by modal-based optimization phase retrieval using the ENZ theory to obtain the wavefront error of the tested lens;
wherein step S2 specifically comprises:
S2.1: using defocus intensity image $I_{m'}$ obtained in step S1 as an initial defocus intensity image for a subsequent iteration in an ENZ mode; setting an initial defocus distance of the image sensor (5) as $f_0$; setting a total number K of iterations to remove a cross term, an initial number k=1 of iterations to remove the cross term, a total number L of iterations for a defocus position, an initial number l=1 of iterations for the defocus position, an aperture of the lens (3) to be tested and a number of terms in a Zernike polynomial;
S2.2: calculating each element of a modal gradient matrix of a system of equations for solving a coefficient of the Zernike polynomial according to a defocus distance, to obtain a modal gradient matrix V of the system of equations for solving a coefficient of the Zernike polynomial;
S2.3: removing an overexposed pixel of initial defocus intensity image $I_{m'}$ to obtain a defocus intensity image with the overexposed pixel removed, and removing an element in a row corresponding to the overexposed pixel from modal gradient matrix V to obtain a modal gradient matrix with the overexposed pixel removed;
S2.4: calculating a Zernike coefficient matrix A of the Zernike polynomial by using a least squares method according to the defocus intensity image and the modal gradient matrix with the overexposed pixel removed;
S2.5: calculating cross term $I_c$ of an ENZ diffraction mode according to the Zernike coefficient matrix A;
S2.6: removing cross term $I_c$ from initial defocus intensity image $I_{m'}$ to obtain a defocus intensity image with the cross term removed;
S2.7: determining whether the number k of iterations to remove the cross term is greater than K; if not, letting k=k+1, using the defocus intensity image with the cross term removed as an initial defocus intensity image, and returning to step S2.3; if yes, proceeding to the next step;

S2.8: determining whether the number l of iterations for the defocus position is greater than L; if not, calculating a correction value $\Delta f$ of the defocus distance according to $$\Delta f = \frac{\beta_{power}\lambda}{\pi(1-\sqrt{1-NA^2})},$$

subtracting the correction value of the defocus distance from a current value thereof as a defocus distance for a subsequent iteration, taking the defocus intensity image obtained in step S1 as an initial defocus intensity image, letting the number of iterations for the defocus position be l=l+1, letting the number of iterations to remove the cross term be k=1, and returning to step S2.2, wherein, $\beta_{power}$ is a coefficient of a fourth term of the Zernike polynomial, $\lambda$ represents a wavelength of incident light, and N represents the number of pixels in a lateral direction of the defocus intensity image; if yes, using the obtained Zernike coefficient matrix to fit the wavefront phase error of the lens (3) to be tested, and calculating a true defocus position U of the image sensor (5) by $$U = \exp\left(i \times \sum_{n,m} \beta_n^m \times Z_n^m\right)$$

according to the Zernike coefficient matrix, wherein, $\beta_n^m$ represents a Zernike coefficient in the Zernike coefficient matrix, $Z_n^m$ represents the Zernike polynomial, i is an imaginary number, (m,n) represents a pixel of the defocus intensity image, m=1, 2, . . . , M, n=1, 2, . . . , N; M represents the number of pixels in a vertical direction of the defocus intensity image.

* * * * *